United States Patent [19]

Sayer

[11] Patent Number: 4,766,789

[45] Date of Patent: Aug. 30, 1988

[54] APPARATUS AND PROCESS FOR PREPARING BELTS

[75] Inventor: Gerald E. Sayer, Pickering, Canada

[73] Assignee: Xerox Corporation, Stamford, Conn.

[21] Appl. No.: 17,398

[22] Filed: Feb. 24, 1987

[51] Int. Cl.[4] .................................... B23B 3/04

[52] U.S. Cl. .................................... 82/47; 82/59

[58] Field of Search .................... 82/47, 44, 46, 91, 71, 82/58, 83, 60, 63, 101, 102, 84

[56] References Cited

U.S. PATENT DOCUMENTS

| | | | |
|---|---|---|---|
| 465,075 | 12/1891 | Grantland | 82/44 |
| 1,758,729 | 5/1930 | Wilson | 82/47 |
| 1,986,587 | 1/1935 | Lundington | 164/69 |
| 3,107,563 | 6/1970 | Sauer | 82/48 |
| 3,576,147 | 4/1971 | Kerr, Jr. | 83/187 |
| 3,875,832 | 4/1975 | Mayfield | 82/4 C |
| 4,072,072 | 2/1978 | Harb | 82/91 |
| 4,292,867 | 10/1981 | Stoffels et al. | 82/47 |

*Primary Examiner*—Frederick R. Schmidt
*Assistant Examiner*—Blynn Shideler
*Attorney, Agent, or Firm*—Peter H. Kondo

[57] ABSTRACT

Apparatus and process for fabricating flexible belts in which the apparatus comprises at least one cylindrical mandrel having a plurality of moveable segments arranged around the periphery of the mandrel, each of the segments having an outwardly facing gripping surface which cooperates with adjacent gripping surfaces on adjacent segments to form a substantially cylindrical surface having at least one annular groove which circumscribes the substantially cylindrical surface. The segments are movable radially away from the axis of the mandrel to grip a flexible tube. Upon rotation of the mandrel, at least one cutting means adjacent to and spaced from the groove and the cylindrical surface of the segments are moved relative to each other whereby the cutting means circumscribes the mandrel along a path defined by the groove to cut the tube into belts.

8 Claims, 2 Drawing Sheets

APPARATUS AND PROCESS FOR PREPARING BELTS

BACKGROUND OF THE INVENTION

This invention relates in general to apparatus and processes for fabricating flexible belts.

Various techniques have been devised to fabricate belts from flexible tubes. One difficulty with cutting flexible tubes is the need to prevent collapse of the tube during the cutting operation. This problem has been addressed, for example, by using centrifugal force to expand an expandable tube against the interior of a rotating support cylinder. The segment projecting beyond one end of the rotation support cylinder may be cut by a knife. Unfortunately, for tubes that have a delicate outer surface that must be protected from damage during processing, damage can occur to the outer surface due to abrasive contact between the outer surface of the flexible tube and the inner surface of the support cylinder during acceleration of the tube to expand it and during deceleration of the tube in preparation for removal of the tube from the support cylinder.

Reinforced belts have been cut from a belt-band by supporting the belt-band on two parallel cylinders that are moved away from each other to stretch the belt-band for cutting. Each end of each cylinder is supported to maintain the parallel relationship of the cylinders during stretching of the belt-band. This approach is time consuming and cumbersome because at least one end of each cylinder must be separated from its support to permit loading and unloading of the belt-band from the cylinders. Moreover, at least one of the cylinders must be sequentially moved toward, away from, and toward the other cylinder to permit loading stretching and unloading, respectively, of the Belt-band.

Belts can also be prepared from continuous webs by slicing the webs lengthwise, cutting the sliced webs into short segments and thereafter welding opposite ends of the webs together. Unfortunately, this involves a batch process that consumes considerable time, requires duplicate manual handling, occupies excessive floor space and necessitates extensive equipment for alignment, cutting, welding trimming and other processing steps. In addition, the resulting belt has a seam which is highly undesirable for many applications.

PRIOR ART STATEMENT

U.S. Pat. No. 1,986,587 to L. L. Ludington, issued Jan. 1, 1935—A technique for sectionalizing tubes is disclosed in which an expansible tube 10 is placed within a rotatable carrier 11 and is rotated so that centrifugal forces cause the tube 10 to expand within the rotating carrier 11. A severing force is then applied by a cutting edge to that portion of the expansible tube 10 projecting beyond one end of rotating carrier 11 such that the expanded tube is cut.

U.S. Pat. No. 3,576,147 to C. E. Kerr, Jr., issued Apr. 27, 1971—A belt cutter is disclosed comprising a disc-shaped cutting member 42 which is rotated against a disc-shaped anvil **32*a*** to cut an endless belt into narrower strips.

U.S. Pat. No. 4,292,867 C. A. Stoffels et al issued Oct. 6, 1981—An apparatus and method for slitting elongated rolls of material is disclosed in which a roll of web material is rolled on a tubular core and a slitting assembly comprising a circular knife blade 42 and circular saw blade 44 is controlled so as to cut the roll into plural strips.

U.S. Pat. No. 3,107,563 H. C. Sauer, issued Oct. 22, 1963—An apparatus for cutting belt bands is disclosed comprising an endless belt which is mounted on rotatable support means 34 and 35. A cutter 65 engages the belt, to cut it into individual strips.

Excessive manual handling required by many belt fabrication techniques increases the likelihood of damage to sensitive substrates or coatings, particularly for coated substrates that must meet precise tolerance requirements such as flexible electrostatographic imaging members including photoreceptors for high speed electrostatographic copiers, duplicators, printers and the like. Scratches and even fingerprints on the vulnerable surfaces of a sensitive, flexible photoreceptor renders the photoreceptor unacceptable for most electrostatographic copiers, duplicators and printers. Moreover, because of differences in belt size requirements for different electrostatographic copiers, duplicators, printers and the like, a machine suitable for fabricating a belt of one diameter or width cannot be readily used to prepare a belt of a different diameter or width.

Thus the characteristics of belt fabrication systems exhibit deficiencies for rapidly manufacturing belts having precise tolerance requirements.

SUMMARY OF THE INVENTION

It is an object of the invention to overcome the above-noted deficiencies by providing apparatus for fabricating flexible belts comprising a cylindrical mandrel having a plurality of moveable segments arranged around the periphery of the mandrel, each of the segments having an outwardly facing gripping surface which cooperate with adjacent gripping surfaces to form a substantially cylindrical surface having at least annular one groove which circumscribes the substantially cylindrical surface, means to move the segments radially toward the axis of the mandrel, means to move the segments radially away from the axis of the mandrel, means to rotate the mandrel, at least one cutting means adjacent to and spaced from the groove, and means to move the cutting means and the cylindrical surface of the segments relative to each other whereby the cutting means circumscribes the mandrel along a path defined by the groove. It is another object of the invention to provide a process for fabricating flexible belts comprising providing flexible tube having a thin wall, inserting within the tube a mandrel having an expandable substantially cylindrical outer surface having an outer gripping surface, expanding the mandrel until the the outer gripping surfaces frictionally engage the inner surface of the flexible tube, cutting the flexible tube from the outside surface of the tube along a path that circumscribes the tube to form a tube segment, and contracting the mandrel to disengages the gripping surfaces from the inner surface of the flexible tube.

BRIEF DESCRIPTION OF THE DRAWINGS

A more complete understanding of the process and apparatus of the present invention can be obtained by reference to the accompanying drawings wherein.

DESCRIPTION OF THE PREFERRED EMBODIMENTS

Figure 1:
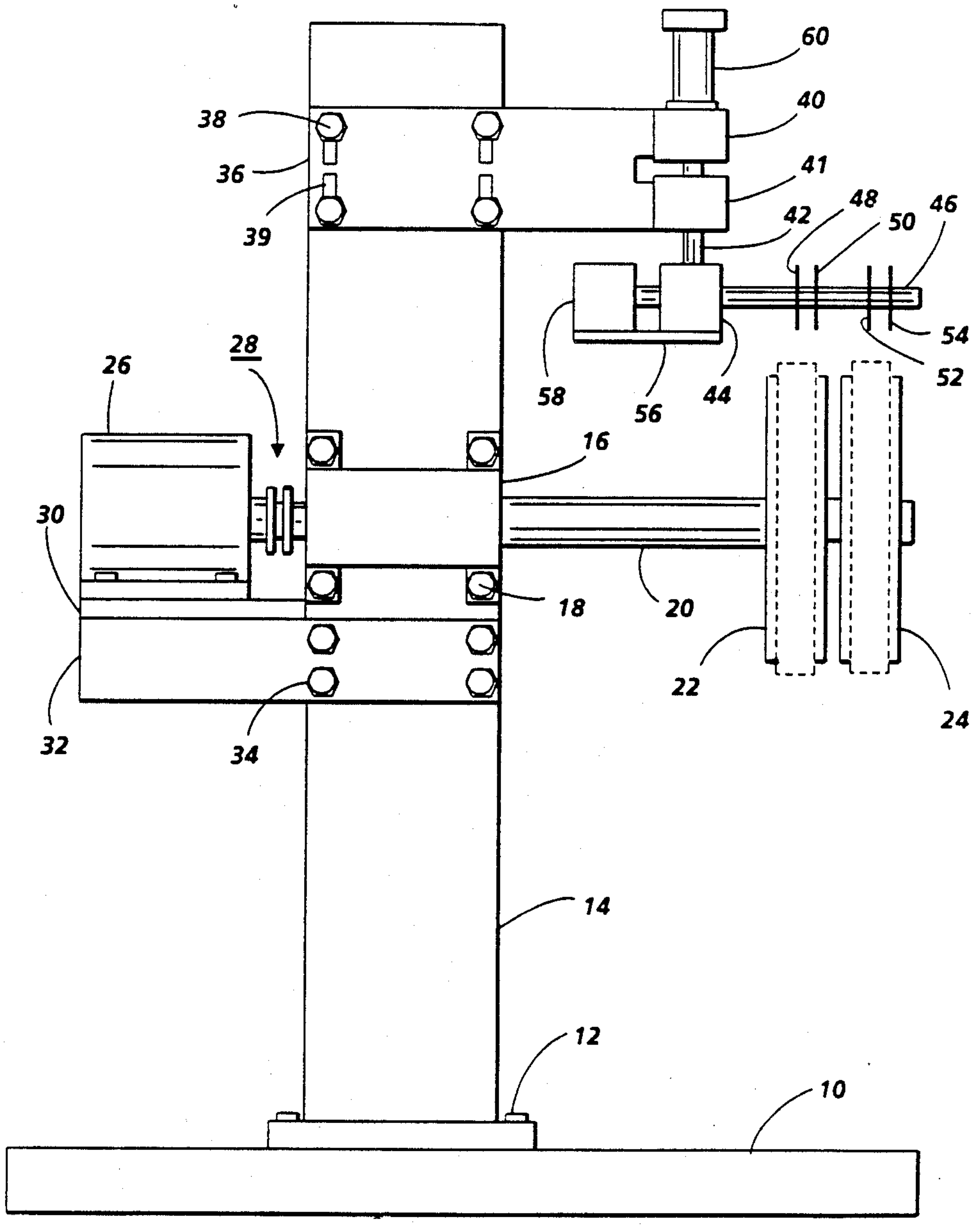
FIG. 1 is a schematic, elevational view showing a belt fabrication apparatus of this invention.

Referring to FIG. 1, of the drawing there is provided a base plate 10 upon which is mounted by bolts 12 a vertical I beam post 14. A bearing plate 16 is bolted to post 14 by bolts 18. Bearing plate 16 supports a rotatable shaft 20. Cylindrical mandrels 22 and 24 are mounted on on end of rotatable shaft 20. A variable speed electric motor 26 is coupled to the other end of shaft 20 through a conventional coupling device such as Lovejoy coupling 28. If desired, any suitable coupling device such as a universal may be substituted for the Lovejoy coupling. Motor 26 is mounted on a plate 30 which is welded to a support bracket 32. Support bracket 32 is secured to post 14 by bolts 34. A cutter support bracket 36 is fastened to post 14 by means of bolts 38. Solts 39 are provided in bracket 36 to permit adjustment in a vertical direction. Bearing supports 40 and 41 welded to the bifurcated end of bracket 36 support a slidable shaft 42 having a square cross section. A bearing support 44 welded to the lower end of shaft 42 supports a horizontal rotatable cutter shaft 46. Cutting disks 48, 50, 52, and 54 are mounted on on end of shaft 46. A plate 56 is welded to the bottom of bearing support 44. The plate 56 supports a cutter shaft drive motor 58 which is coupled directly to cutter shaft 46. A two-way acting pneumatic cylinder 60 is mounted on bearing support 40 and is adapted to extend and retract shaft 42 in a vertical direction. The two-way acting pneumatic cylinder 60 is placed in the extend or retract mode by means of conventional valves and suitable air hoses (not shown) connected to a source of compressed air. If desired, any other suitable device for extending or retracting the cutting blade may be substituted for the two-way acting pneumatic cylinder, e.g. solenoid, cam and lever arm, and the like. Similarly, suitable conventional cutting devices such as non rotating knife blades, rotating saw blades, and the like may be substituted for the rotating cutting disks if desired.

Figure 3:
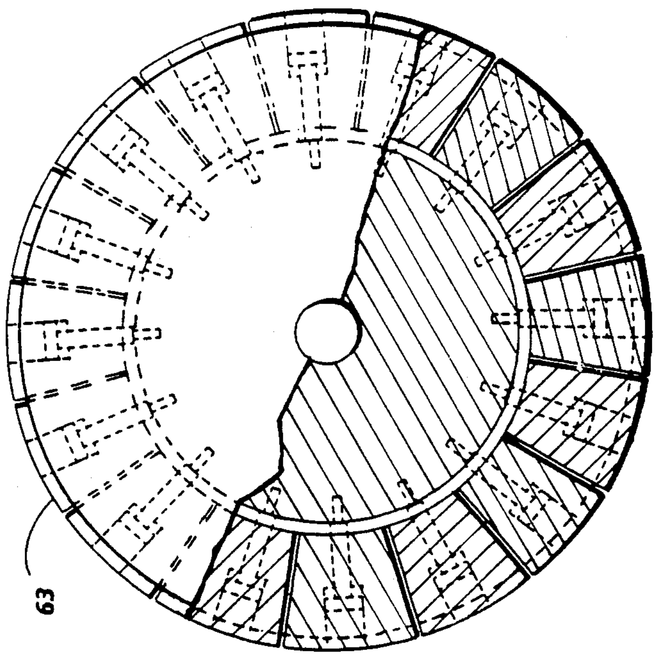
FIG. 3 is a schematic, side elevational and partial sectional view of a mandrel of this invention having an expandable substantially cylindrical outer surface.
Figure 2:
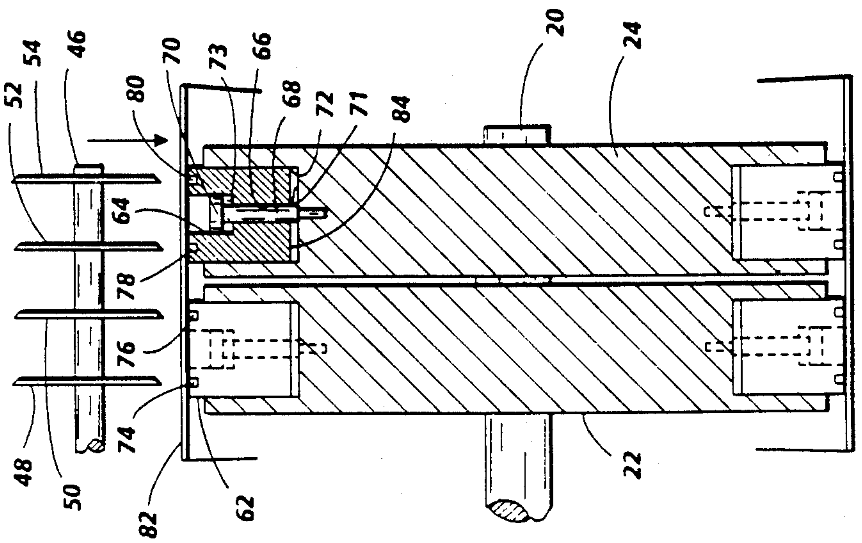
FIG. 2 is a schematic, diametrical cross-sectional view of a mandrel of this invention having an expandable substantially cylindrical outer surface.

As shown in FIGS. 2 and 3, cylindrical mandrel 22 mounted on rotatable shaft 20 carries a plurality of movable segments 62. Each movable segment 62 is adapted to move in a radial direction toward and away from rotatable shaft 20. Each movable segment 62 has an arcuate outwardly facing gripping surface 63 which together with outwardly facing gripping surfaces of adjacent movable segments forms a substantially cylindrical surface. In one embodiment, each movable segment 62 contains a large diameter hole 64 and a small diameter hole 66 and is adapted to reciprocate on shouldered guide screw 68. Guide screw 68 has a head 70 slightly smaller than the diameter of the large diameter hole 70. Guide screw 68 is screwed into the bottom 71 of annular channel 72 of movable segment 62. An optional coil spring 73 surrounds the portion of guide screw 68 between head 70 and the bottom of large diameter hole 64 to bias movable segments 62 radially toward shaft 20. Each movable segment 62 contains at least one groove 74 which together with grooves of adjacent movable segments forms an annular groove around cylindrical mandrel 22. Thus, grooves 74, 76, 78 and 80 are adapted to receive the edges of cutting blades 48, 50, 52 and 54, respectively when rotatable cutter shaft 56 is lowered toward mandrels 22 and 24. These grooves provide clearance for the cutting blades as they cut through the surface of flexible tube 82 and compensate for any variation of the outer periphery of the arcuate outwardly facing gripping surfaces 63 from a true circle during the cutting operation. In FIG. 2, a partial view of a flexible tube 82 is shown with the movable segments 62 radially extended away from shaft 20 so that the arcuate outwardly facing gripping surfaces 63 of adjacent movable segments 62 form a substantially cylindrical surface in contact with the inner surface of flexible tube 82. In the extended position, the bottom 84 of each segment 62 is spaced from the bottom 71 of annular channel 72.

In operation, electrical power to variable speed electric motor 26 is initially off by turning control knob of a conventional potentiometer (not shown). Since the cylindrical mandrels 22 and 24 are stationary, each movable segment 62 is in a retracted position because each coil spring 72 biases the movable segments 62 radially toward shaft 20. Since the segments 62 are in a retracted position, the substantially cylindrical surface defined by the arcuate outwardly facing gripping surfaces 63 of the movable segments 62 has a perimeter that is smaller than the substantially cylindrical surface defined by the arcuate outwardly facing gripping surfaces 63 when the movable segments 62 are in an extend position. The smaller perimeter of the substantially cylindrical surface defined by the arcuate outwardly facing gripping surfaces 63 is also smaller than the inside perimeter of the flexible tube 82 to facilitate sliding of the flexible tube 82 on over mandrels 22 and 24 for subsequent cutting. The two-way acting pneumatic cylinder 60 is in a retracted mode to provide sufficient clearance between the cutting blades 48, 50, 52 and 54 and mandrels 22 and 24 during loading of flexible tube 82 onto mandrels 22 and 24. After the flexible tube 82 is loaded onto mandrels 22 and 24, power is supplied to rotate shaft 20 at an rpm sufficient to cause centrifugal force to drive the movable segments 62 radially away from shaft 20 and to compress coil springs 73. The outwardly facing gripping surfaces 63 of the radially extended segments 62 grip the inner surface of flexible tube 82 to hold it immobile relative to the extended segments 62. Electric power is then supplied to motor 58 by activation of a conventional switch (not shown) to cause shaft 46 to rotate. Compressed air is thereafter supplied to the upper end of two-way acting pneumatic cylinder 60 to lower the lower edge of cutting blades 48, 50, 52 and 54 through one side of flexible tube 82 into grooves 74, 76, 78 and 80, respectively. As the cylindrical mandrels 22 and 24 and flexible tube 82 rotate, the cutting blades 48, 50, 52 and 54 circumferentially slice the flexible tube 82 into separate belts. Upon completion of the cutting operation, the supply of compressed air to the upper end of two-way acting pneumatic cylinder 60 is diverted by a suitable conventional valve (not shown) to the lower end of two-way acting pneumatic cylinder 60 thereby raising cutting blades 48, 50, 52 and 54 away from mandrels 22 and 24. Power supplied to motor 26 is terminated and the segments 62 are allowed to return the retracted position due to the bias supplied by the springs 73. The sliced sections of the flexible tube 82 are thereafter readily removed from mandrels 22 and 24.

If desired, other suitable means for retracting the segments 62 may be substituted for the optional compression type coil springs 72. Thus, one may use tension coil springs that pull rather than push the segments 62 toward shaft 20. Instead, at least one large circular coil springs may be placed in a deep channel extending around the periphery of segments 62 to encircle all the segments 62 and bias the segments 62 toward shaft 20. Alternatively, suitable two way actuators such as solenoids, pneumatic cylinders or hydraulic cylinders may be substituted for coil springs 72. However, the omission of coil springs or other biasing devices is preferred because of the simplicity, size and low cost of the devices. During loading of an unbiased mandrel, the mandrel is stationary and the top segments are retracted due to gravity. The bottom segments are lifted by the operator as the tube is slid onto the mandrel with a rotating action. If desired, stationary knife blades may be substituted for the rotating disk shaped cutting blades 48, 50, 52 and 54.

Although only two mandrels are shown in the drawings, any suitable number of mandrels may be used. Further, the mandrels may be spaced from each other as shown in the Figures, closely adjacent to or in contact with each other. Moreover, the grooves in the segments may be of any desired number depending upon the width of the segments and width being sought. The grooves in the segments are essential because the outer diameter of the segments often describe a slightly varying true circle during operation. Thus, the grooves provide the flexibility required to accommodate any variations of the belt internal diameter. Moreover, stationary or other suitable knife blades may be substituted for the rotating disk shaped cutting blades 48, 50, 52 and 54.

The speed of rotation of the mandrels depends upon numerous factors such as the diameter of the mandrel, weight of the segments, strength of the coil springs, distance that the segments, must move, resilience of the flexible tube and the like. However, the speed of rotation of the mandrels should be sufficient sufficient to allow centrifugal force to drive the movable segments radially away from shaft and so that the outwardly facing gripping surfaces of the radially extended segments grip the inner surface of flexible tube to hold it immobile relative to the extended segments.

In one process of this invention a flexible seamless, tube of thermoplastic resin having a thickness of about 0.2 mm, a length of about 18 cm and an inside perimeter of about 33 mm was manually fed over a disk shaped mandrel. The mandrel was similar in construction to the mandrel illustrated in FIGS. 2 and 3 and comprised an acetal resin (Delrin, available from E. I. du Pont de Nemours & Co.). The mandrel had three wide parallel grooves to hold three parallel rings of segments. Each segment was aluminum and was 6.5 cm×4.5 cm at the bottom, 6.5 cm×6 cm at the top and the radial distance from the bottom to the top was about 5 cm. Each segment had a pair of parallel grooves having a rectangular cross-section with a width at the top of about 1.3 mm and a depth of about 5 mm. These grooves were 2.5 mm apart and were parallel to each face of the disk shaped mandrel. There were 16 segments positioned in a channel around the periphery of the mandrel. The outer gripping surface of each segment are flush with the outer periphery of the mandrel when the segments are retracted. The mandrel had an outside circumference of about 33 cm when the segments were extended. The mandrel was mounted on a shaft supported at one end in the chuck of a metal lathe. The other free end of the shaft was temporarily supported by a bearing block during the cutting operation. The bearing block was adapted to slide away from the end of the shaft to facilitate sliding of the flexible seamless tube onto the mandrel. This apparatus occupied a floor space of about 1.5 meters×3.6 meters. No biasing devices were used for the segments. During loading of the unbiased mandrel, the mandrel was stationary and the top segments were retracted due to gravity. The bottom segments were lifted by the operator as the flexible tube was slid onto the mandrel with a rotating action. After sliding the bearing block into position to support the free end of the shaft, the shaft carrying the mandrel and tube was rotated at 800 rpm to force the aluminum segments radially outwardly on shouldered guide screws from the axis of the mandrel by centrifugal force. The segments moved radially outwardly away from the shaft until the gripping surfaces of the segments firmly gripped and tautly supported the interior of the flexible tube. Slitting disks supported on a common shaft revolving at about 10,000 RPM were positioned opposite the circumferential grooves in the gripping surface of the segments and moved toward the axis of the mandrel to slice the seamless tube into belts. The 5 newly formed belts and scrap end material were removed from the mandrel after the lathe was stopped. The resulting belts were free of creases and the outside surfaces were undamaged. Moreover, precise belt widths with a tolerance of ±0.005 inch was achieved. The apparatus and process of this invention minimizes the equipment needed for alignment, cutting, trimming and other processing of the belts. In addition, the apparatus and process of this invention achieve greater uniform belt quality. This process was repeated with a mandrel having 5 channels carrying aluminum segments to produce 11 belts. The 11 resulting belts were also free of creases and exhibited precise belt widths with a tolerance of ±0.005 inch. This apparatus was thereafter converted, within a period of about one hour, to fabricate belts of a different width by merely changing the mandrel and alligning cutting blades opposite the circumferential grooves in the gripping surface of the segments.

The apparatus and process of this invention can cut flexible tubes in less time without contacting the outside surface of the tubes thereby decreasing the likelihood of damage to delicate tubes or coatings thereon, particularly for coated substrates that demand precision tolerances. Moreover the apparatus of this invention occupies little floor space and minimizes the equipment needed for alignment, cutting, trimming and other processing of the belts. In addition, the apparatus and process of this invention achieve greater uniform belt quality. Also, because of differences in belt size requirements for different applications, the apparatus of this invention can be rapidly and easily converted from fabricating a belt of one diameter or width to preparing a belt of a different diameter or width by merely changing the mandrel and position of the cutting blades. Moreover, the characteristics of belt fabrication systems of this invention exhibit are capable of manufacturing belts of different widths and diameters within precise tolerance standards.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. Apparatus for fabricating flexible belts comprising at least one cylindrical mandrel having a plurality of moveable segments circumferentially arranged in a ring around the periphery of said mandrel, each of said segments having an outwardly facing gripping surface which cooperates with adjacent gripping surfaces on adjacent segments in said ring to form a substantially cylindrical surface having at least one annular groove which circumscribes said substantially cylindrical surface, means to guide said segments radially toward and away from the axis of said mandrel in a direction perpendicular to said axis of said mandrel, means to rotate said mandrel and to move said segments under an applied centrifugal force radially away from said axis of said mandrel in a direction perpendicular to said axis of said mandrel, at least one cutting means adjacent to and spaced from said groove, and means to move said cutting means and said cylindrical surface of said segments relative to each other whereby said cutting means circumscribes said mandrel along a path defined by said groove.

2. Apparatus for fabricating flexible belts according to claim 1 wherein said outwardly facing gripping surface which cooperates with adjacent gripping surfaces to form a substantially cylindrical surface has at least two annular grooves.

3. Apparatus for fabricating flexible belts according to claim 1 including means to move said segments radially toward the axis of said mandrel in a direction perpendicular to said axis of said mandrel.

4. Apparatus for fabricating flexible belts according to claim 3 wherein said means to move said segments radially toward the axis of said mandrel in a direction perpendicular to said axis of said mandrel comprises a coil spring.

5. Apparatus for fabricating flexible belts according to claim 1 wherein said means to move said segments radially away from said axis of said mandrel in a direction perpendicular to said axis of said mandrel is a motor adapted to rotate said mandrel.

6. A process for fabricating flexible belts comprising providing a flexible tube having a thin wall, providing at least one cylindrical mandrel having a plurality of moveable segments circumferentially arranged in a ring around said mandrel, each of said segments having an outwardly facing gripping surface which cooperates with adjacent gripping surfaces on adjacent segments in said ring to form a substantially cylindrical surface having at least one annular groove which circumscribes said substantially cylindrical surface, mounting said tube around said mandrel, expanding said mandrel by moving said segments under an applied centrifugal force radially away from the axis of said mandrel in a direction perpendicular to said axis of said mandrel until all of the said outwardly facing gripping surfaces frictionally engage the inner surface of said flexible tube, cutting said flexible tube from the outside surface of said tube along a path that circumscribes said tube to form a tube segment, contracting said mandrel by moving said segments radially away from the axis of said mandrel in a direction perpendicular to said axis of said mandrel to disengage said gripping surfaces from said inner surface of said flexible tube and removing said tube segment from said mandrel.

7. A process for fabricating flexible belts according to claim 6 including terminating application of said centrifugal force to said moveable segments to allow at least some of said segments to retract under the influence of gravity radially away from said axis of said mandrel in a direction perpendicular to said axis of said mandrel, and removing said tube segment from said mandrel after terminating application of said centrifugal force to said moveable segments.

8. A process for fabricating flexible belts according to claim 6 including cutting said flexible tube from the outside surface of said tube along a plurality of parallel paths that circumscribe said tube to form a plurality of tube segments.

* * * * *